UNITED STATES PATENT OFFICE.

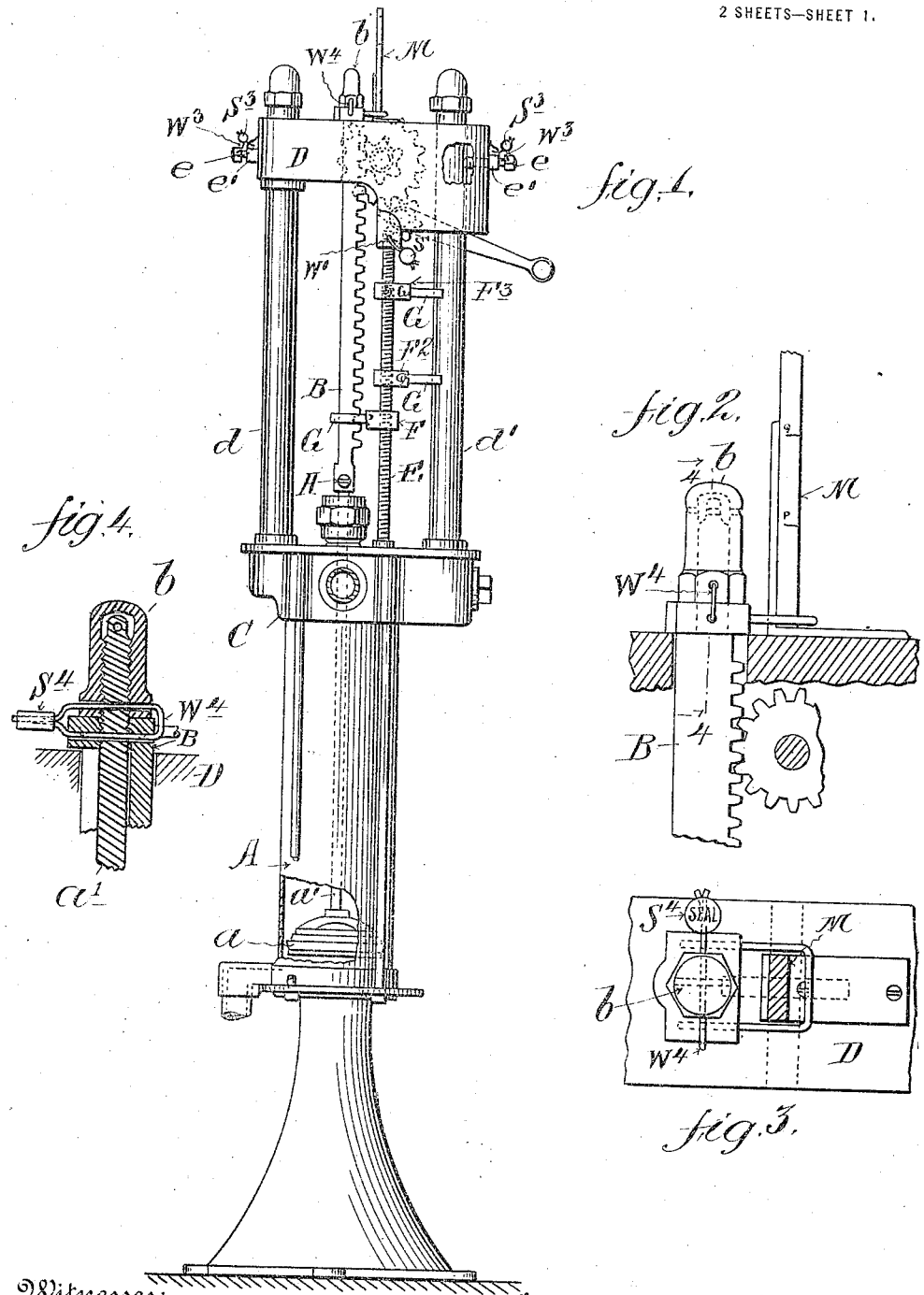

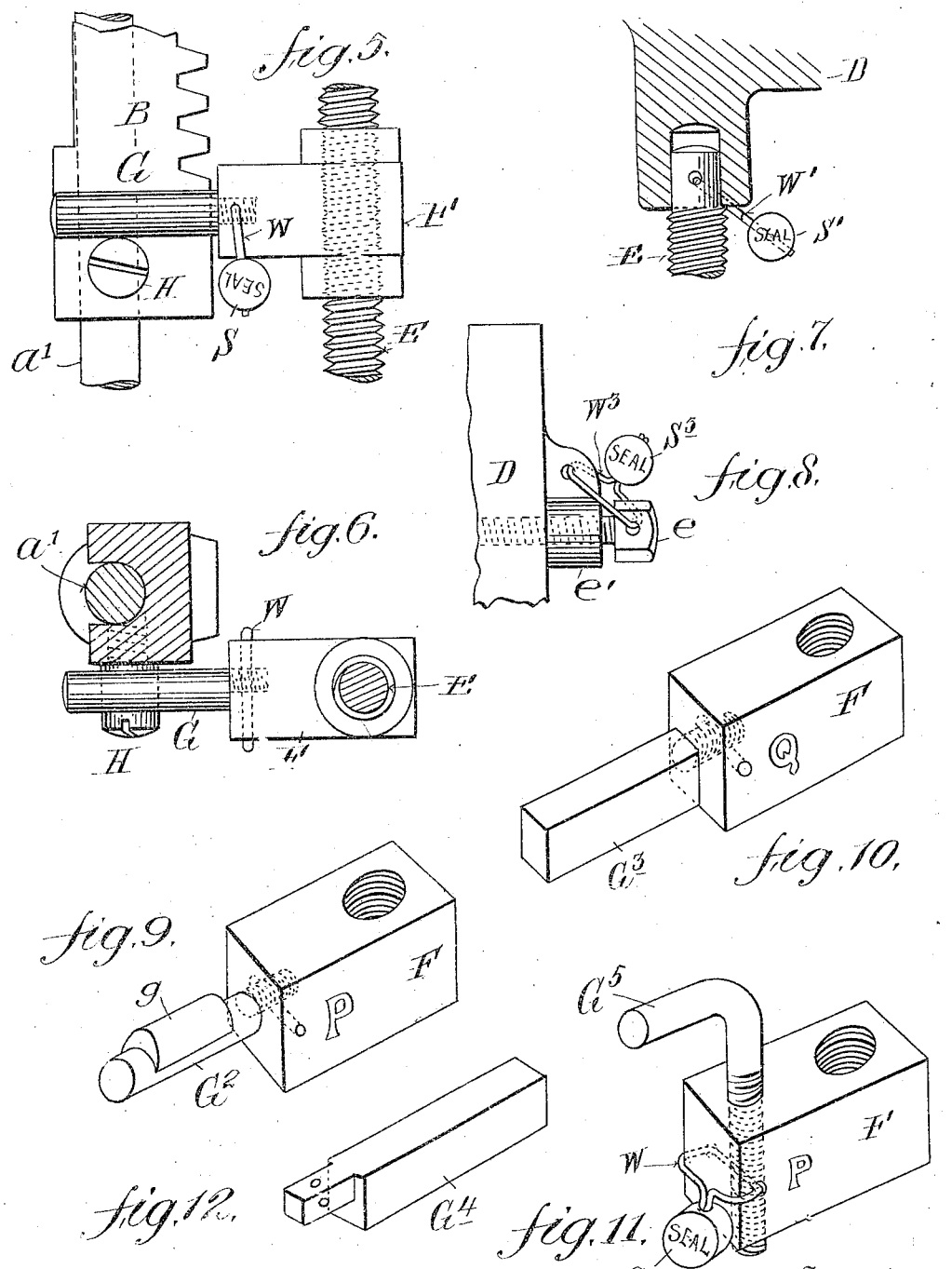

FRANK W. MEEGAN, OF NEW YORK, N. Y., ASSIGNOR TO GILBERT AND BARKER MANUFACTURING COMPANY, OF SPRINGFIELD, MASSACHUSETTS, A CORPORATION OF MASSACHUSETTS.

MEASURING-PUMP.

1,172,820.  Specification of Letters Patent.  Patented Feb. 22, 1916.

Application filed May 4, 1910. Serial No. 559,343.

*To all whom it may concern:*

Be it known that I, FRANK W. MEEGAN, a citizen of the United States, residing in the city of New York, in the county and State of New York, have invented certain new and useful Improvements in Measuring-Pumps, of which the following is a specification.

In such pumps, as usually constructed, the amount of liquid to be delivered by each complete throw of the pump piston is determined by means of a series of fingers, one or another of which, as desired, makes contact with a stop on the pump piston rod.
Since the cylinder of such a pump has usually a large cross-sectional area, it is necessary that the stop fingers shall be very accurately located, since a slight departure from the proper position in either direction will result in a very considerable error in the amount of liquid delivered.

The object of my improvements is to provide for the exact location of the fingers with resulting accuracy in the output of the pump, and also to prevent any change in the adjustment of the parts after they have been set in the proper position.

The invention will be best understood by reference to the accompanying drawings, illustrating an embodiment thereof, Figure 1 of which shows a side elevation of a complete pump with my invention applied thereto. Fig. 2 shows a side elevation on an enlarged scale; Fig. 3 a plan view, and Fig. 4 a vertical section of the top of the rack-bar, by means of which the piston rod of the pump is operated, with means for sealing the same in place; Fig. 5 shows a side elevation on an enlarged scale, and Fig. 6 a plan view of an eccentric stop-finger; Fig. 7 shows a side elevation of the top of the threaded rod on which the stop-fingers are carried; Fig. 8 shows a side elevation of means for sealing the pump head in place;
Figs. 9, 10, 11 and 12 show perspective views of modified forms of eccentric stop-fingers.

Referring to the drawings, A indicates the cylinder of a self-measuring pump having a piston, $a$, and piston rod, $a'$, arranged to be operated by suitable gearing engaged with a rack-plate, B, which is adjustably mounted on the piston rod, $a'$. (In this instance the piston rod $a'$ extends through a longitudinal aperture in the rack bar or rack plate B and is provided at its upper end with a threaded portion which engages threads in the upper end of the aperture in the rack bar, and the parts are securely locked in their adjusted relation by means of the set nut $b$, see Figs. 1 to 4 inclusive.)

C, indicates the cylinder head of the pump, and D, a head, supported by posts, $d$, $d'$, to which the operating mechanism of the pump is secured, and through which passes the rack-plate, B.

Between the cylinder head, C, and the head, D, extends a threaded rod, E, parallel with the rack-plate, B, the lower end of which is screwed into the cylinder head, C, and the upper end of which engages the head, D, when the latter is set into place in assembling the pump, as shown in Fig. 7. Upon the threaded rod, E, are carried blocks, F, F², F³, which are screwed thereon before the head, D, is set in place. The blocks, F, F², F³, are of such size that they can be rotated around the rod, E, between the rack-plate, B, and the post, $d'$, and hence can be screwed up or down into desired positions after the parts are assembled. Into each of the blocks, F, is inserted a stop-finger, G, of such length as to contact with the rack-plate, B, when swung in one direction, and with the post, $d'$, when swung in the opposite direction, and arranged, when swung against the rack-plate, B, to make contact with a pin, H, which projects from the rack-plate, upon the upward movement of the rack-plate, and thus stop the upward movement of the piston and the discharge of liquid.

In order to insure the delivery of exact quantities of liquid, I provide for accurate adjustment of the point at which one of the stop-fingers, G, will come in contact with the pin, H, as follows: It will be understood that, if the location of the point at which a stop-finger, G, is to make contact with the pin or stop, H, depended entirely on the rotation of the block, F, on the threaded rod, E, the point reached might not determine the exact delivery of a given amount of liquid, since, unless a given number of turns of the block, F, on the rod, E, should bring it to such a position that the stop-finger, G, should make contact with the pin, H, at the exact moment when the required quantity of liquid has been delivered, it would be impossible to obtain exact adjustment by further vertical movement of the block, F, which must be given an entire turn in order to bring the stop-finger, G, into position to contact with the pin, H, and hence would be carried past the required position by the vertical movement given by one complete rotation. I therefore provide for a further adjustment by providing means for making the surfaces of the stop-fingers, G, which are adapted to make contact with the pin, H, vertically adjustable, independent of the vertical movement of the blocks, F, in which they are inserted. This may be accomplished by making the contact surface of the stop-finger, G, in planes which are at different distances from the center line of that portion of it which is inserted in the block, F, as by making it a cylinder eccentric to such center line as shown in Figs. 5 and 6, or having a raised eccentric portion, as shown in Fig. 9, in which the finger is designated $G^2$ and the eccentric portion $g$ or with plane surfaces at different distances from said center line, as shown in Figs. 10 and 12 in which figures the finger is designated $G^3$ and $G^4$ respectively; or the entire stop-finger may be given a delicate vertical adjustment by providing it with a finely threaded portion engaging with a correspondingly threaded socket in the block, F, as shown in Fig. 11, in which the finger is designated $G^5$. The blocks carrying the respective stop fingers may be conveniently marked as with "P," "Q," "1/2 G," etc., to indicate the amount of liquid expelled by the pump to the moment when their respective fingers limit or arrest the piston, indicating one pint, or one quart, one-half gallon, etc., as indicated in Figs. 1, 9, 10 and 11.

In assembling the pump, when the block, F, has been brought as near the desired point as possible by rotating it on the rod, E, the stop-finger, G, is inserted therein and rotated until it is in such a position that the pin, H, will come in contact therewith at the exact moment when the limited quantity of liquid has been delivered. In this manner a very exact adjustment can be had and at the same time the advantage of employing a threaded rod to carry the blocks, F, whereby any movement of the blocks by reason of the impact of the pin, H, is prevented, is retained.

It will be understood that in practice any desired number of the blocks, F, carrying the stop-fingers, G, may be set upon the rod, E, the several stop-fingers being so adjusted that they will respectively contact with the pin, H, upon the delivery of different predetermined quantities such as pints, quarts, &c.

In order to prevent any tampering with those parts by the movement of which a misadjustment of the stop-fingers, G, might be effected, I seal together such relatively movable parts after the stop-fingers have been properly adjusted. This may be effected by means of a wire, W, passed through the relatively movable parts, the two ends of which are secured together by an identifiable seal, S, as, for example, the official seal of a sealer of weights and measures. In this way the integrity of the pump is permanently guaranteed, and any attempt to misadjust it can be readily detected. For this purpose it is important that the stop-fingers, G, shall be sealed to the blocks, F, after having been adjusted, and also that the upper end of the rod, E, shall be sealed to the head, D, whereby rotation of the rod is prevented. Still further security may be provided by sealed wires, $W^3$, engaging set screws, $e$, $e$, which pass through the head, D, into the rods, $d$, $d'$, and ears, $e'$, $e'$, on the head, whereby any unauthorized removal of the head, D, is prevented, and also by sealed wire, $W^4$, engaging the top of the rack-plate, B, and the piston rod $a'$, whereby any further rotation of the piston rod in the rack-plate and consequent change in the throw of the piston is prevented. In this manner not only is any direct tampering with the stop-fingers, G, made impossible, but any removal of the head, D, through which a change in the relative position of the stop-fingers and the pin, H, might be indirectly effected, by moving the rod, $a'$, or the rack-plate, B, is also prevented. The presence of the seals in an unbroken condition also indicates, and assures the customer, that the pump will deliver the exact amount of liquid called for. The importance of thus assuring a permanently exact delivery will be readily appreciated by those skilled in the art.

What I claim as new and desire to secure by Letters Patent is:

1. In a measuring pump, the combination with a cylinder and piston, a piston rod, vertical standards connected with the head of the piston and a head block carried by said standards, a rack bar connected with the piston rod, and extending through said head block and an actuating pinion on said head block engaging the rack bar, of a stop operatively connected with the rack bar, a vertically disposed threaded bar supported in the cylindrical head and head block and held from rotation, a plurality of rotatable blocks having interiorly threaded apertures engaging said threaded rod, and a stop arm carried by each of said blocks, and adapted to be moved into and out of operative relation with the stop on said rack bar, said arms being of such length as to engage said rack bar and one of said standards to limit the rotary movements of said blocks.

2. In a measuring pump, the combination with a cylinder and piston, a piston rod, vertical standards connected with the head of the piston and a head block carried by said standards, a rack bar connected with the piston rod, and extending through said head block and an actuating pinion on said head block engaging the rack bar, of a stop operatively connected with the rack bar, a vertically disposed threaded bar supported in the cylinder head and head block and held from rotation, a plurality of rotatable blocks having interiorly threaded apertures engaging said threaded rod, and a stop arm carried by each of said blocks, and adapted to be moved into and out of operative relation with the stop on said rack bar, said arms being of such length as to engage said rack bar and one of said standards to limit the rotary movements of said blocks, and means for adjusting each of said arms independently with respect to its rotatable block, in a direction longitudinally of said threaded rod.

3. In a measuring pump, the combination of a reciprocable bar, a stop thereon, a rod parallel with said bar, a plurality of blocks on said rod each thereof mounted for limited swinging movement and adapted to be swung into and out of the path of said stop, contacting portions on said blocks eccentrically mounted therein to permit vertical adjustment relative to said stop, and means to seal said portions in their adjusted positions.

4. In a measuring pump, the combination with a reciprocable bar, of a rod parallel with said bar, and a plurality of stops carried by said rod, each thereof freely movable through a definite arc and arranged to be swung into and out of a position to be engaged by said bar, each of said stops including a movable eccentrically mounted portion arranged to engage said bar and to permit vertical adjustment of the stop and means for sealing said portions to the stops in their adjusted positions.

5. The combination in a measuring pump of a reciprocable member, a rod parallel therewith, stops on said rod, each thereof mounted for limited swinging movement and arranged to be swung into a position to be engaged by said member, vertically adjustable portions for said stops and means to seal said portions in their adjusted positions.

6. In a measuring pump, a supporting frame, a reciprocable bar for operating the piston rod, a stationary rod fixed to the frame in parallel relation to said bar, a member rotatably mounted on said rod and fixed against longitudinal movement with respect thereto, an eccentric stop device mounted on a horizontal axis in said member for vertical adjustment and being adapted to swing into line with an abutment on said bar, and means to seal said device in adjusted position.

In testimony whereof, I have hereunto subscribed my name, this 28th day of April, A. D. 1910.

FRANK W. MEEGAN.

Witnesses:
MAX W. HECKMAN,
CLARKSON A. COLLINS.